United States Patent
Chazelas et al.

[11] Patent Number: 5,424,747
[45] Date of Patent: Jun. 13, 1995

[54] PROCESS AND SYSTEM FOR DETERMINING THE POSITION AND ORIENTATION OF A VEHICLE, AND APPLICATIONS

[75] Inventors: Jean Chazelas, Paris; Philippe Souchay, Issy les Moulineaux, both of France

[73] Assignee: Thomson-CSF, Paris, France

[21] Appl. No.: 167,830
[22] PCT Filed: Apr. 9, 1993
[86] PCT No.: PCT/FR93/00365
   § 371 Date: Dec. 16, 1993
   § 102(e) Date: Dec. 16, 1993
[87] PCT Pub. No.: WO93/21540
   PCT Pub. Date: Oct. 28, 1993

[30] Foreign Application Priority Data
Apr. 17, 1992 [FR] France .................. 92 04767

[51] Int. Cl.[6] .......................................... G01S 13/91
[52] U.S. Cl. ................................ 342/70; 342/125; 342/146
[58] Field of Search ............ 342/70, 71, 72, 125, 342/146

[56] References Cited

U.S. PATENT DOCUMENTS

| | | | |
|---|---|---|---|
| 4,148,028 | 4/1979 | Fuliki | 342/70 |
| 4,308,536 | 12/1981 | Sims, Jr. et al. | 342/70 |
| 4,464,662 | 8/1984 | Tomasi | 342/125 |
| 4,818,999 | 4/1989 | Kobayashi et al. | 342/70 |
| 5,045,859 | 9/1991 | Yetter | |
| 5,233,353 | 8/1993 | Guena et al. | 342/125 |

FOREIGN PATENT DOCUMENTS

0038151 10/1981 European Pat. Off. .

OTHER PUBLICATIONS

"New Automatic Vehicle Identification System for Detection of Traffic Without Lane Discipline", Electronics & Communication Engineering Journal, by Manh Anh Do and Jin Teong Ong, pp. 99–107, Jun. 1991.

*Primary Examiner*—Mark Hellner
*Attorney, Agent, or Firm*—Meltzer, Lippe, Goldstein et al.

[57] ABSTRACT

The present invention relates to a process and a system for determining the position and orientation of a mobile, and to applications thereof.

In order to ascertain both the position and orientation of a mobile, the invention proposes an interrogation/response process whose particular feature is to supply, to a given interrogation, two responses which are distinguished on the one hand, by different modulating frequencies and, on the other hand, by the fact that they are transmitted according to two patterns which differ in aim relative to one another. It is then possible, simply by measuring the angular deviation of either one of the two responses, and simply by measuring the ratio of the amplitudes of the two responses received, to deduce on the one hand the angular position $\phi$ and on the other hand the orientation $\theta$ of the mobile.

The applications in the automobile sector are numerous (anticollision, control of road traffic and of compliance with the highway code, automatic toll points, etc.).

16 Claims, 5 Drawing Sheets

PROCESS AND SYSTEM FOR DETERMINING THE POSITION AND ORIENTATION OF A VEHICLE, AND APPLICATIONS

The present invention relates to a process and a system for determining the position and orientation of a vehicle, as well as to applications especially in the automobile sector.

In the particular automobile sector, and more precisely in the context of studies of anti-collision systems for vehicles, the detection of vehicles by conventional radar techniques represents a sizable effort. Indeed, the studies conducted are confronted with the fact that the vehicle to be detected is firstly uncooperative, and moreover sends back information which may be drowned in ground clutter. The level of ground clutter is very strongly linked to the environment (bridges, metal panels, tunnels, bends, etc.), and induces a very sizable false alarm rate at detector radars. It is then necessary to employ complex radar processing to obtain the kinematics of a scene.

Furthermore, it may be extremely important to ascertain the orientation or course followed by a vehicle; consider in fact the situation in which one car is following another, the first entering a bend but still being within the field of visibility of the second car. It is readily understood that the danger which exists for the second car differs depending on whether the first car has a course which allows it to take the bend normally or else, on the contrary, a course which represents a loss of line.

Thus, a first objective of the invention is to propose a process making it possible to give both the position and orientation of a mobile, without requiring complex processing.

A second objective of the invention is to render the vehicle cooperative so as to facilitate detection thereof.

A third objective of the invention is to minimize to the maximum the contribution from ground clutter due to the environment of the vehicle.

More precisely, the invention relates to a process for determining the position and orientation of a vehicle, characterized in that it consists in:

transmitting, from a radar containing two channels for reception and for processing, an interrogation signal with a given frequency f;

retransmitting, from said vehicle, at least two response signals formed by modulating said interrogation signal received by the vehicle respectively by a modulating frequency $F_1$ and by a modulating frequency $F_2$ which differs from $F_1$, the two response signals being retransmitted according to two respective transmission patterns $D_1$ and $D_2$ which differ in aim relative to one another by an angle $\alpha$, and each relative to the direction of orientation (YY') of the mobile by an angle $\gamma_1$ and $\gamma_2$ respectively, at least two of the three angles $\alpha$, $\gamma_1$ and $\gamma_2$ being supplied to the radar;

measuring, from the two reception channels, the angular deviation of either of the two response signals and deducing therefrom the angular position $\phi$ of the vehicle relative to the radar;

measuring the ratio of the amplitudes of the two response signals received on one of the reception channels;

deducing therefrom, based on the angles supplied and on the shape of the patterns $D_1$ and $D_2$, the orientation $\theta$ of the vehicle relative to the radar.

We shall see that the radar which emits the interrogation signal may be stationary or vehicle, thus enabling the process to be applied to a good number of applications in the automobile sector (anti-collision, control of road traffic and of compliance with the highway code).

Lastly, we shall see that the system according to the invention is addressed at the progressive integration of novel means allowing other applications (automatic toll points, etc.), without calling the basis system into question.

Other advantages will emerge in the light of the following description, given with reference to the attached figures:

FIG. 5 shows a possible enhancement of the device 1 of FIG. 3a;

Figure 1:
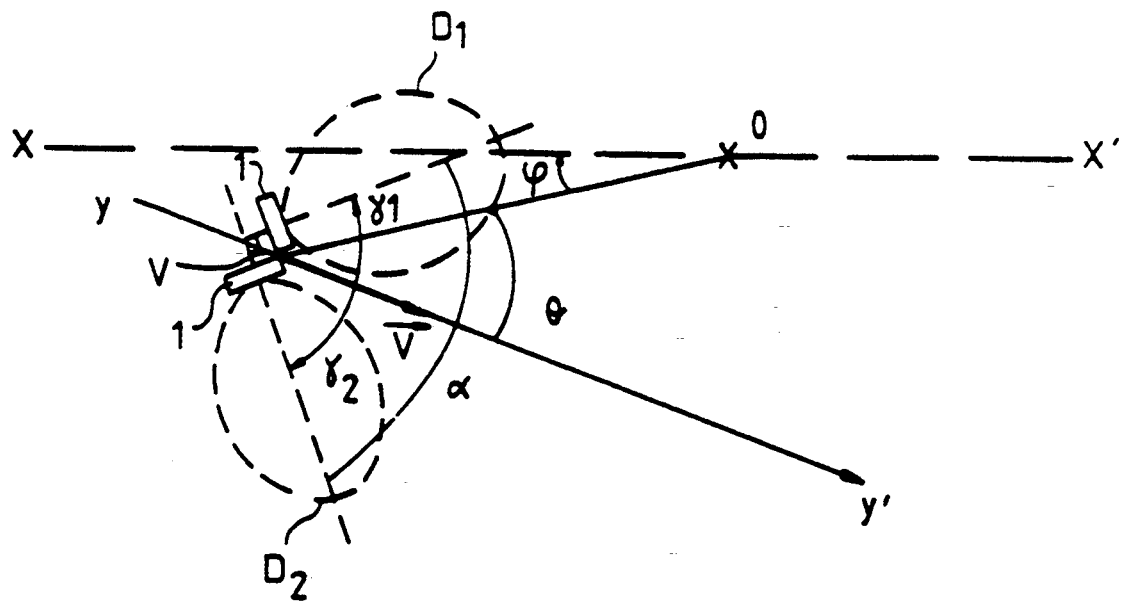
FIG. 1 illustrates part of a system implementing the process for computing the position and orientation of a mobile according to the invention.

In FIG. 1, a radar (not represented) located at the point O emits a so-called interrogation signal at a given frequency f in its working frequency band, for example the W band. In the example employed, the interrogation signal is a maximum on the XX' axis. A vehicle V is moving with velocity $\overline{V}$ parallel to the YY' direction. At the interrogator radar, the kinematics and geometry of the scene will be fully determined by knowing:

the angle $\phi$ giving the angular position of the vehicle V relative to the XX' axis of the radar taken as reference axis;

the angle $\theta$ between the straight line (OV) and the YY' axis giving the orientation or course followed by the vehicle V;

the Doppler frequency fD giving the radial speed of the vehicle V.

In order to determine at least two of these three parameters, namely the two angles $\psi$ and $\phi$, the process according to the invention proposes to render the vehicle V cooperative with regard to the interrogator radar. To do this, the vehicle V is equipped with at least two devices 1 capable of receiving the interrogation signal, and of then each retransmitting a response signal formed, according to the invention, by modulating the interrogation signal by different modulating frequencies $F_1$ and $F_2$ respectively. According to an essential characteristic of the invention, the two response signals are retransmitted in accordance with two transmission patterns $D_1$ and $D_2$ of the devices 1, whose aims differ relative to one another by a fixed angle $\alpha$, equal to 90° in the example of the figure, and each by an angle $\gamma_1$ and $\gamma_2$ respectively relative to the direction of orientation (YY') of the mobile. At least two of the three angles $\alpha$, $\gamma_1$ and $\gamma_2$ must be supplied to the radar. The transmission patterns $D_1$ and $D_2$ are preferably identical and/or symmetric relative to the direction of orientation YY' of the mobile V, so as to simplify the processing. Advantageously, the frequencies $F_1$ and $F_2$ are chosen such that the two response signals are at frequencies lying outside the spectrum of the ground echoes, whilst still being compatible with the working frequency band of the interrogator radar.

Moreover, in order to facilitate, at the radar, the separation of the two response signals, these two modulating frequencies $F_1$ and $F_2$ are such that their difference is greater, in absolute value, than the frequency resolution of the radar.

Figure 2:
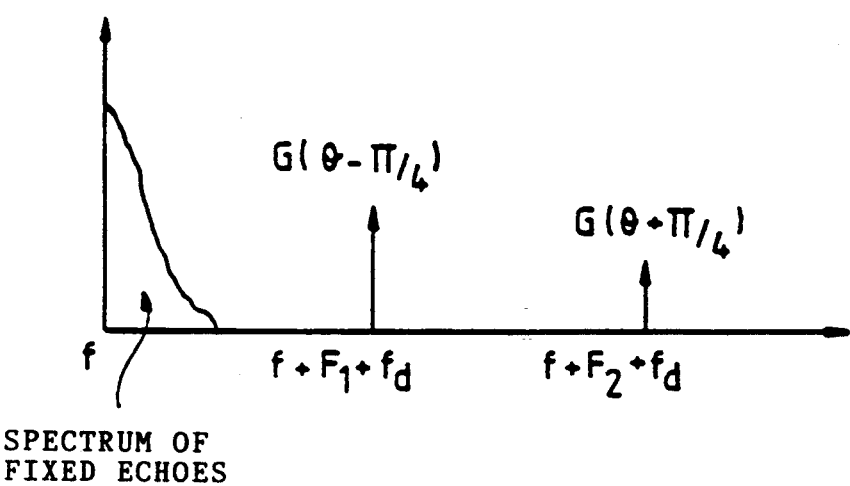
FIG. 2 shows an example of the signals received by the interrogator radar, in accordance with the process of the invention.

FIG. 2 shows an illustrative spectrum of response signals which may be received by the interrogator radar. As stated earlier, the interrogator signal has been modulated by two different modulating frequencies $F_1$ and $F_2$ chosen so as to create, in the spectrum received by the interrogator radar, at least two clearly distinct spectral lines lying outside the spectrum of the fixed echoes. If fD is the Doppler frequency resulting from the motion of the detected mobile, it is possible to choose the two spectral lines which are then at frequencies $(F_1+f_Df)$ and $(F_2+f_Df)$. Each of the spectral lines has, moreover, an amplitude which depends on the overlap between the reception pattern (not represented) of the interrogator radar and one and/or the other of the two transmission patterns $D_1$ and $D_2$, this overlap itself depending on the angular position $\phi$ on the orientation $\theta$ of the V relative to the interrogator radar, and on the shape of the patterns $D_1$ and $D_2$.

To determine the orientation $\theta$ of the vehicle V, the process according to the invention proposes to measure the ratio of the amplitudes of the response signals received by the radar. This measurement, combined with a knowledge of at least two angles of the three angles $\alpha$, $\gamma_1$ and $\gamma_2$ as well as a knowledge of the pattern shapes, enables the orientation $\theta$ of the vehicle to be deduced through a straightforward computation.

In the case of FIG. 1, the angles $\gamma_1$ and $\gamma_2$ and $\alpha$ have been chosen to simplify the processing. Indeed, the patterns $D_1$ and $D_2$ are identical and symmetric relative to the direction of orientation, so that $$\phi_1 = \phi_2 = \frac{\alpha}{2}$$

The angle $\alpha$ has, moreover, been chosen equal to $\pi/2$.

If the ratio is measured of the amplitude response signal retransmitted according to pattern $D_1$ to the amplitude of the response signal retransmitted according to pattern $D_2$, this ratio is then proportional to tan $$\tan\left(\theta + \frac{\pi}{4}\right)$$

a relation which enables the angle $\theta$ to be computed very straightforwardly.

As regards determination of the angular position $\phi$, the interrogator radar must make a conventional angular deviation measurement, that is to say a comparison with the levels of the signal received on two channels conventionally termed the sum channel and difference channel, the signal in question being one or the other of the two response signals.

Lastly, as regards the speed V of the vehicle, this may be determined by any known Doppler system. However, a variant of the process according to the invention, which consists in supplying the interrogator radar with the modulating frequencies $F_1$ and $F_2$ advantageously enables this speed to be computed. Indeed, as we stated earlier, the two spectral lines received by the radar are at respective frequencies $(f+f_D+F_1)$ and $(f+f_D+F_2)$. Knowing the values f, $F_1$ and $F_2$, it is possible, by measuring the two received frequencies, to deduce therefrom the value of the Doppler frequency $f_D$ and hence the radial speed of the mobile. Determination of the angle $\theta$ and of the radial speed then enables the velocity of the vehicle to be deduced.

Figure 3A:
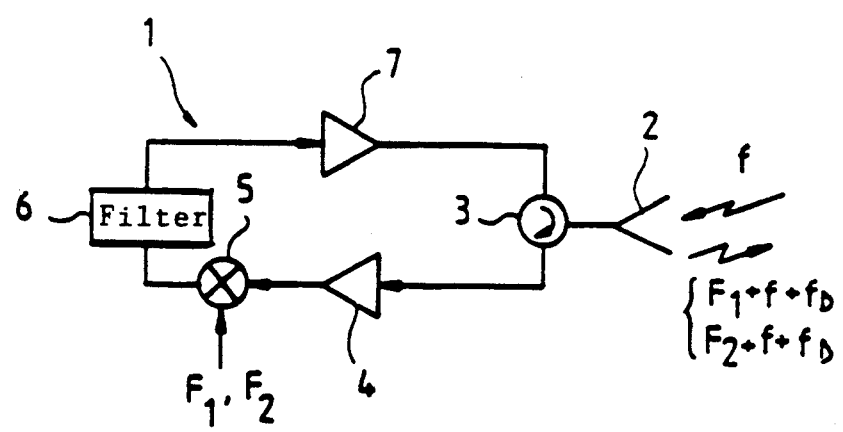
FIGS. 3a and 3b are two illustrative embodiments of a device 1 of FIG. 1.

FIG. 3a is a first illustrative embodiment of a device 1 placed on the vehicle and capable, as stated earlier, of receiving the interrogation signal at the frequency f of the radar, then of retransmitting a response signal formed, according to the invention, by modulating the interrogation signal received by a modulating frequency $F_1$ (or $F_2$). According to FIG. 3a, the device 1 includes means 2 for receiving the interrogation signal, for example an antenna of horn type. The interrogation signal received at the frequency f is then preferably amplified by a low-noise amplifier 4. The signal from the amplifier is modulated, according to the invention, by a modulating frequency $F_1$ (or $F_2$) by way of modulating means 5, for example a mixer. The modulating means 5 therefore deliver two signals, one at the frequency $f+F_1$ (or $f+F_2$), and the other at the frequency $f-F_1$ (or $f-F_2$).

It is advantageous to use a filter 6 at the output of the modulating means 5 so as to retain just a single frequency, for example $f+F_1$ (or $f+F_2$). The remaining signal is then preferably amplified by an amplifier 7 so as to create an equivalent radar area greater than that of the vehicle carrying the device 1, and thus to promote detection. Finally, the device 1 includes means 2 for transmitting the signal obtained, that is to say the response signal. Here, the means of transmission are identical to the means of reception, which explains the presence of a microwave frequency circulator 3. This obviously in no way constitutes a limitation. Bearing in mind the motion of the carrier mobile at a speed V, the response signal retransmitted by the transmission means 2 is at the frequency $f+F_1+f_D$ (or $f+F_2+f_D$).

Figure 3B:
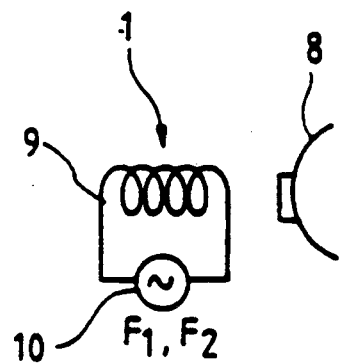

FIG. 3b is another possible embodiment of the device 1, for which implementation is of the electro-mechanical type: a reflector surface 8 here constitutes the means of transmission and of reception of the device 1. This surface undergoes a mechanical displacement when a signal of frequency $F_1$ (or $F_2$) is applied to a radiating element 9 by way of a generator 10. The result is identical to that of FIG. 3a, namely that a response signal is obtained at a frequency $f+F_1+f_D$ (or $f+F_2+f_D$).

In one or the other of the previous illustrative embodiments of the device 1, the mobile to be detected must be fitted with at least two devices 1 fixed by any means to the mobile and oriented relative to one another such that their transmission patterns differ in aim by an angle $\alpha$.

Figure 4:
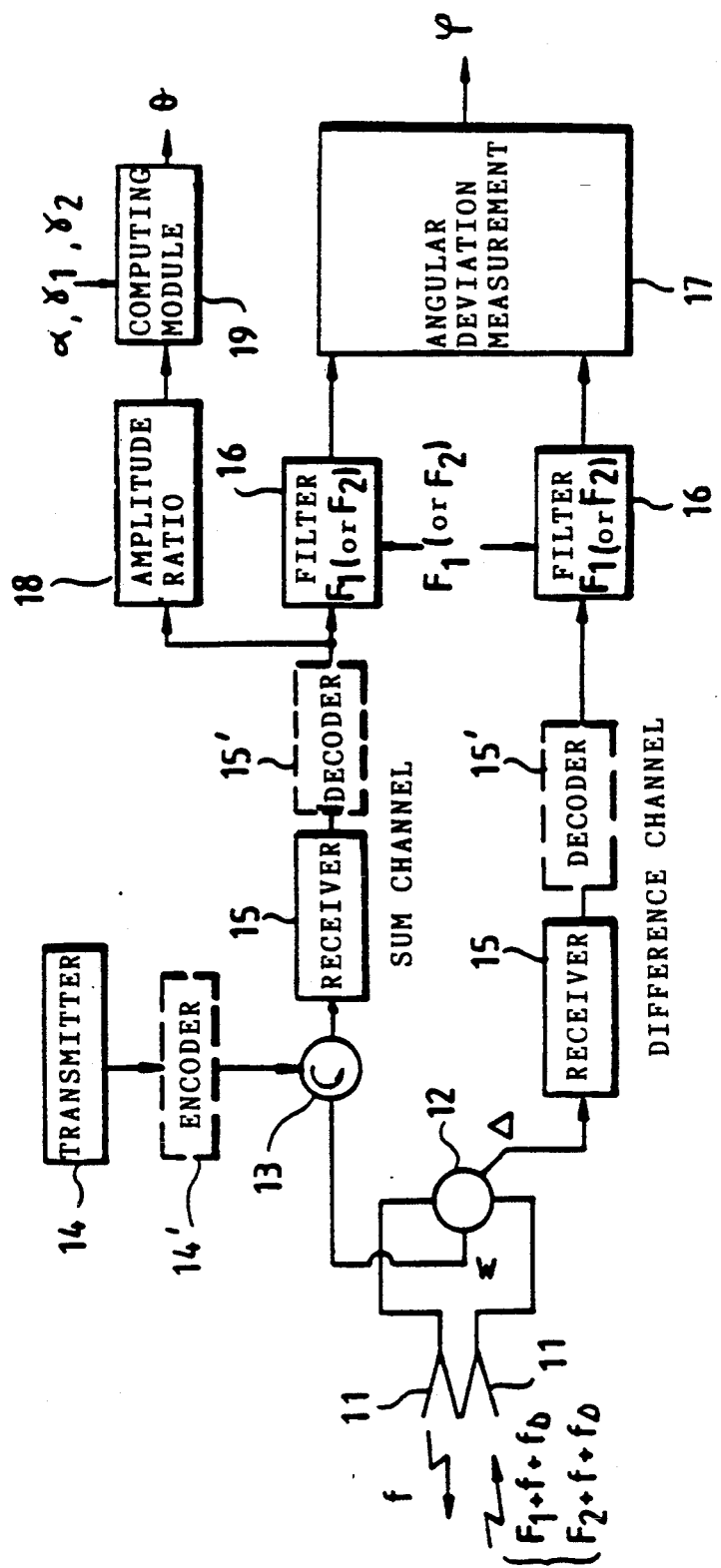
FIG. 4 is one possible illustrative embodiment of an interrogator radar according to the invention.

FIG. 4 is one possible illustrative embodiment of an interrogator radar forming part of the system according to the invention.

So as to be able to perform the measurements of distance and of angular deviation (angular position of the detected mobile), the radar is of the monopulse, for example amplitude-comparison type, and conventionally employs two channels for reception and processing, namely a sum channel $\Sigma$ and a difference channel $\Delta$. The radar comprises two adjacent sources 11 connected up to the two inputs of a hybrid junction 12. This hybrid junction 12 delivers the sum and difference signals on the sum channel $\Sigma$ and on the difference channel $\Delta$ respectively. In transmit mode, the sum channel is used, hence the presence of a circulator 13 for routing the signal from a transmitter 14 to the sources 11. In receive mode, the radar employs means 15, 16 and 17 for measuring the angular deviation of either one of the two response signals in order to deduce therefrom the angular position $\phi$ of the vehicle. The response signals received are firstly processed by a receiver 15, of the superheterodyne type, conventionally providing for the transposition into base band and amplification of the received signals. During operation of the system according to the invention, the signals leaving the two receivers 15 are at frequencies $F_1+f_d$ and $F_2+f_d$. Each reception channel employs an identical filter 16 centred on one or the other of the frequencies $F_1$ and $F_2$.

The signals from the filters 16 are then supplied to a module 17 which computes the angular deviation and thus delivers the angular position $\phi$ of the mobile.

As regards determination of the orientation $\theta$ of the vehicle, the radar employs means 18 for computing the ratio of the amplitudes of the signals from preferably the receiver 15 of the sum channel.

This ratio is next supplied to a module 19 which then determines, with the aid of at least two of the three angles $\alpha$, $\gamma_1$ and $\gamma_2$ defined earlier, the sought-after orientation $\theta$.

Although we have described, by way of one possible illustrative embodiment, a radar of monopulse type only, the adaptation of the process according to the invention to other waveforms can be envisaged.

We have, heretofore, described the basic function of the system according to the invention, namely the determination of the position and orientation of a vehicle relative to a radar. An enhancement in the function of the system is possible by enabling the cooperative devices 1 to furthermore afford decoding and/or encoding functions.

Figure 5:
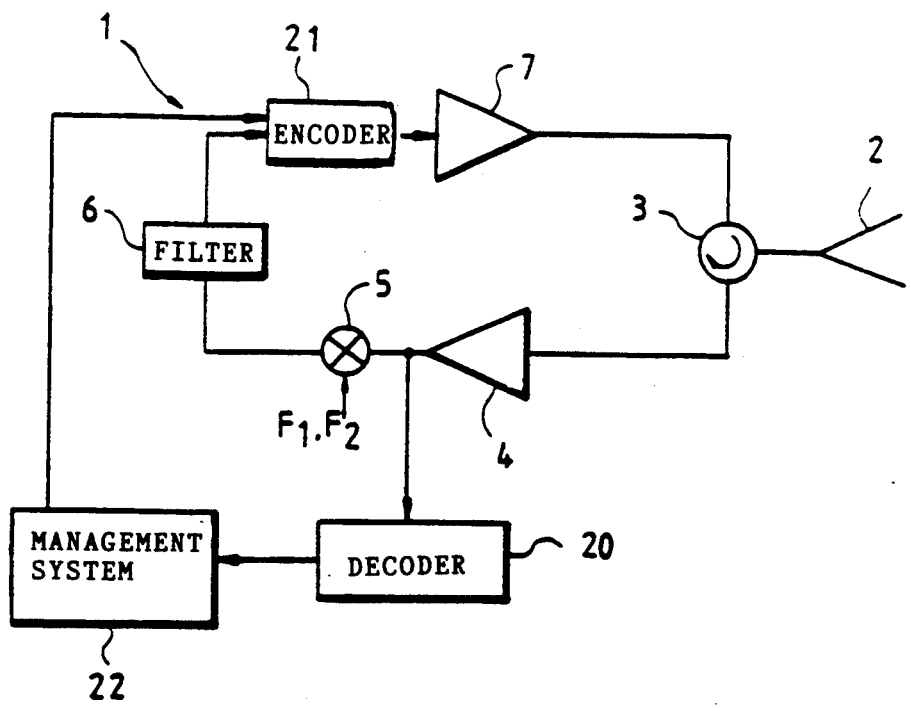

FIG. 5 shows a device 1 capable of affording such functions: the elements of the basic device 1 are identical to those of FIG. 3a, and consequently will not be redescribed. The enhancement consists in equipping the device 1 with a decoder 20 placed for example at the output of the amplifier 41 and/or with an encoder 21 placed for example upstream of the amplifier 7. The rationale behind the decoder 20 assumes, of course, that the interrogation signals contain encoded information generated by any means known to those skilled in the art (binary codes or BARKER codes). At the radar represented in FIG. 4, the signals from the transmitter 14 are encoded, for example in phase, by an encoder 14' represented with a dashed line. The decoded information is next supplied to a management system 22 which can then decide whether it need respond, what should be the contents of the response, etc.

The encoder 21 makes it possible to send, in the response signal, all kinds of information: this may involve the identification of the mobile, the modulating frequency specific to the device 1, the angles $\alpha$, $\gamma_1$ and $\gamma_2$ defined earlier.

These examples are not limiting, and a major importance of the system according to the invention is to allow progressive integration of novel services, without calling into question the initial definition of the system. In the example of FIG. 5, the encoder 21 is controlled by the management system 22. In the system according to the invention, for which at least two devices 1 are necessary, there are several variants of integration: thus, it is possible to choose to fit just one of the devices 1 with an encoder and/or decoder. Likewise, it is possible to couple a single assembly (management system, decoder, encoder) to the two devices 1. If the response signals are encoded, the interrogator radar of FIG. 4 must be provided with decoders 15' situated for example at the output of the receivers 15 of each channel.

Figure 6:
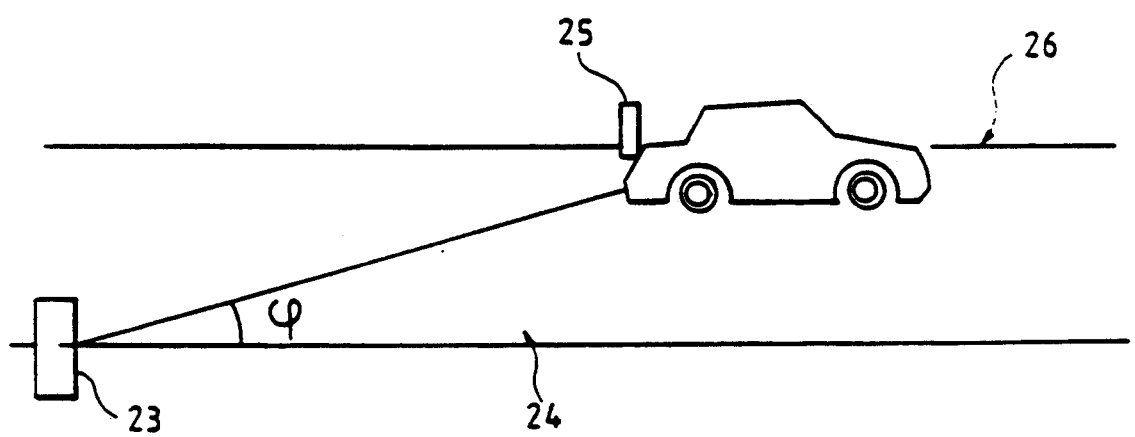
FIG. 6 is a first application of the process according to the invention to a system for controlling and regulating road traffic.

Another major importance of the process and system according to the invention lies in the numerous applications which they may have, especially in the automobile sector:

FIG. 6 is a first application of the process according to the invention to the control and regulation of road traffic:

In this figure, the interrogator radar 23 of the system according to the invention is placed on the verge of a road 24. The other part 25 of the system, i.e. that containing the first and second devices, is placed for example on the rear of a car V.

The radar 23 can thus ascertain at any moment the position m and orientation $\theta$ of the vehicle, and consequently know whether any danger arises from this vehicle. The radar 23 may likewise check whether the driver of the vehicle V in any way infringes the highway code (the exceeding of a speed limit, the crossing of a continuous line 26, etc.). If the cooperative devices of the vehicle are moreover fitted with information encoders, they may also send their identification (registration number, name of the owner of the vehicle, etc.) directly to the radar.

Figure 7:
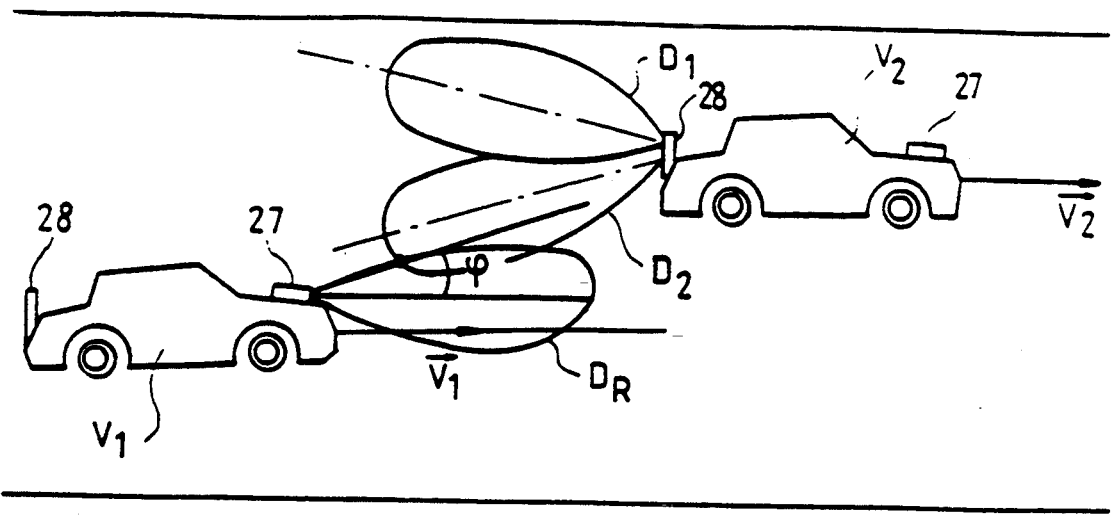
FIG. 7 is a second application of the process according to the invention to an anti-collision system for mobile vehicles.

FIG. 7 is a second application of the process according to the invention to an anti-collision device for mobile vehicles;

Represented in this figure are two vehicles $V_1$ and $V_2$ each fitted with a system according to the invention:

The interrogator radar, labelled 27 in the drawing, is preferably placed at the front of each vehicle, and the assembly 28 composed of two cooperative devices is placed at the rear of each vehicle.

When the radar 27 of vehicle V1 sends an interrogator signal with the pattern $D_R$ it receives two response signals from vehicle $V_2$ which are transmitted, in accordance with the invention, according to the differently aimed patterns $D_1$ and $D_2$. The vehicle $V_1$ therefore knows, at any moment, the position, orientation and speed of the vehicle $V_2$ ahead.

Figure 8:
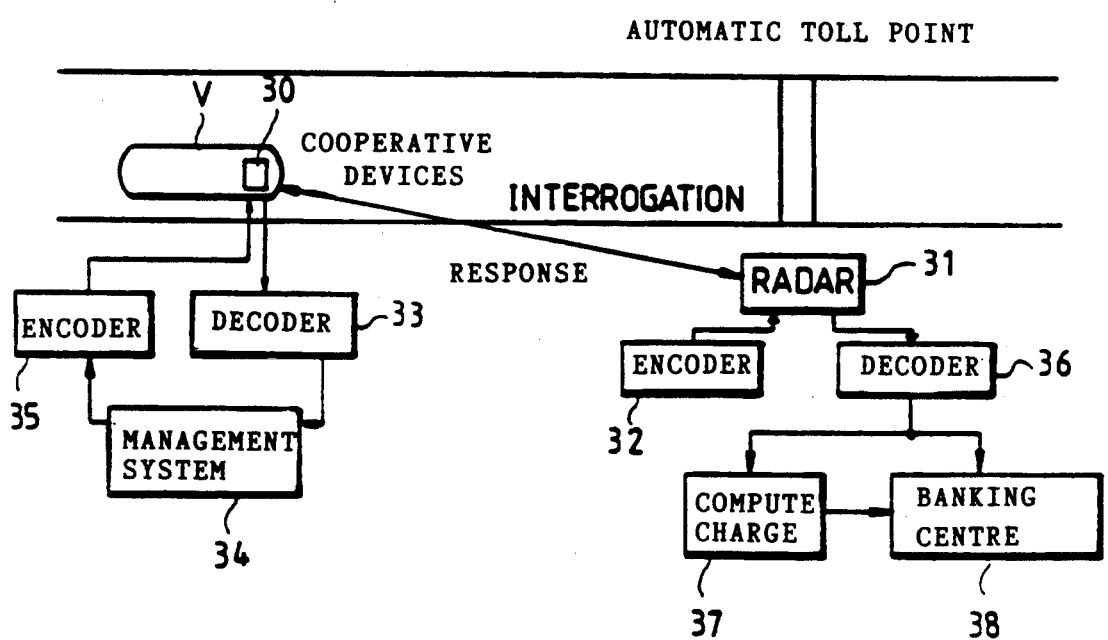
FIG. 8 is a third application of the process according to the invention to automatic motorway toll points.

A third application of the system according to the invention relates to automatic toll points on motorways, illustrated by FIG. 8:

A vehicle V fitted in front with an assembly 30 composed of cooperative devices such as described earlier, arrives at an automatic toll point. An interrogator radar 31 situated on the road verge includes an encoder 32 which enables it to send a specific interrogation to the vehicle V, for example regarding the spot at which the vehicle V joined the motorway, regarding the vehicle owner's bank card number, or any other information (the state of the traffic, etc.). On receiving this interrogation signal, the cooperative devices 30 deliver the received signal to a decoder 33 which supplies the decoded information to a management system 34. The vehicle can then respond according to the process of the invention, by sending in the form of codes, with the aid of an encoder 35, controlled by the management system 34, the expected responses. These responses may consist of a code representing the point at which the vehicle joined the motorway, the number of the bank card, the vehicle registration plate, etc. The radar 31 also employs a decoder 36 of information contained in the response signals. This decoded information is next utilized by units intrinsic to the radar (the module 37 for computing the charge to be paid) or by external units, such as for example a banking centre 38, which checks the validity of the given bank code and makes the debit in accordance with the charge computed by the module 37.

In conclusion, it is important to note that the process according to the invention makes it possible to have, with the same basic system, all kinds of applications in the automobile sector. For this it suffices to integrate on request the novel services into an existing system, without modifying or hindering its prime function.

We claim:

1. Process for determining the position and orientation of a vehicle, comprising the steps of:
   transmitting, from a radar containing two channels for reception and for processing, an interrogation signal with a given frequency f;
   retransmitting, from said vehicle, at least two response signals formed by modulating said interrogation signal received by the vehicle respectively by a modulating frequency $F_1$ and by a modulating frequency $F_2$ which differs from $F_1$, the two response signals being retransmitted according to two respective transmission patterns $D_1$ and $D_2$ which differ in aim relative to one another by an angle $\alpha$, and each relative to the direction of orientation YY' of the vehicle by an angle $\gamma_1$ and $\gamma_2$ respectively, at least two of the three angles $\alpha$, $\gamma_1$ and $\gamma_2$ being supplied to the radar;
   measuring, from the reception channels, the angular deviation of either of the two response signals and deducing therefrom the angular position $\phi$ of the vehicle relative to the radar;
   measuring the ratio of the amplitudes of the two response signals received on one of the reception channels;
   deducing therefrom, based on the angles supplied and on the shape of the patterns $D_1$ and $D_2$, the orientation e of the vehicle relative to the radar.

2. Process according to claim 1, wherein said modulating frequency $F_1$ and $F_2$ are chosen such that the frequencies of said response signals are outside the spectrum of the fixed echoes received by the radar.

3. Process according to claim 1, wherein said transmission patterns $D_1$ and $D_2$ are symmetric relative to said direction of orientation YY' of the vehicle.

4. Process according to claim 1, wherein said transmission patterns $D_1$ and $D_2$ are identical.

5. Process according to claim 1, wherein said modulating frequencies $F_1$ and $F_2$ are supplied to the radar so that it can, by measuring the frequencies of the response signals received, deduce therefrom the velocity of the vehicle.

6. Process according to claim 1, wherein said response signals furthermore include encoded information and wherein the process provides for an additional step for decoding this information at the radar.

7. Process according to claim 1, wherein the interrogation signal furthermore includes encoded information, and wherein the process provides for an additional step for decoding this information at the vehicle.

8. System for determining the position and orientation of a vehicle comprising:
   a radar employing two channels for reception and for processing, called the sum channel and difference channel, and means for emitting an interrogation signal at a given frequency f;
   at least one first and one second device, which are placed on said vehicle, each including means for modulating the received interrogation signal by a modulating frequency $F_1$ for the first device, and $F_2$ which differs from $F_1$ for the second device, and means for transmitting the modulated signal as response signal, the two response signals leaving the first and the second devices being transmitted according to two respective transmission patterns $D_1$ and $D_2$ which differ in aim relative to one another by an angle $\alpha$, and each relative to the direction or orientation YY' of the vehicle by an angle $\gamma_1$ and $\gamma_2$ respectively;
   means for measuring, from the two channels, the angular deviation of either of the two response signals in order to deduce therefrom the angular position $\phi$ of the vehicle relative to the radar;
   means for computing the ratio of the amplitudes of the two response signals received on the sum channel;
   a module for determining the orientation $\theta$ of the vehicle based on computing said ratio.

9. System for determining the position and orientation of a vehicle according to claim 8, wherein the modulating means comprises a mixer, and wherein each of the first and second devices furthermore includes a filter at the output of said mixer so as to retain a single frequency.

10. System for determining the position and orientation of a vehicle according to claim 8, wherein the modulating means comprises a radiating element to which are applied, by way of a generator, a signal with frequency $F_1$ for the first device and $F_2$ for the second device, this radiating element causing a reflector surface constituting said transmission means to undergo a mechanical displacement.

11. System for determining the position and orientation of a vehicle according to claim 8, wherein the first and/or second device furthermore possesses an encoder for sending encoded information in the response signal, and a system for managing the encoded information, and in that the radar includes at least one decoder.

12. System for determining the position and orientation of a wherein according to claim 8, wherein the radar furthermore includes an encoder for encoding the information in the interrogation signal, and wherein the first and/or second device possesses a decoder (20) for decoding this information.

13. System for determining the position and orientation of a vehicle according to claim 8, wherein said measuring means comprises, in each processing channel:
   of a receiver;
   of a filter at the output of said receiver, centered on one or the other of the modulating frequencies $F_1$ and $F_2$, and of a module receiving the outputs from the two filters and computing the angular position $\phi$.

14. Application of the system according to claim 8 to the control and regulation of road-vehicle traffic, wherein the radar (23) is placed on the road verge and wherein each vehicle is fitted with the first and second devices (25).

15. Application of the system according to claim 8 to an anti-collision device for vehicles, wherein each vehicle includes said radar at its front, and said first and second devices at its rear.

16. Application of the system according to claim 11 to automatic toll points for vehicles on a motorway, further comprising a decoder located on a vehicle fitted with the two devices which are connected to said decoder, said decoder receivinq from the radar an interrogation signal containing encoded information and decoding the interrogation signal and supplying the information to a management system, wherein the management system controls the encoder of the vehicle in order to send, in the response signals, encoded information relating to the point at which the vehicle joined the motorway and to the code of the driver's bank card, and wherein the decoder of the radar decodes the information contained in the response signals in order to supply it to a module for computing the charge to be paid and to a banking center which debits the bank card.

* * * * *